United States Patent [19]

Easton

[11] Patent Number: 5,168,768
[45] Date of Patent: Dec. 8, 1992

[54] TILT STEERING COLUMN ASSEMBLY
[75] Inventor: David J. Easton, Cedar Falls, Iowa
[73] Assignee: Deere & Company, Moline, Ill.
[21] Appl. No.: 820,465
[22] Filed: Jan. 14, 1992
[51] Int. Cl.⁵ .......................... B62D 1/18; G05G 5/06
[52] U.S. Cl. ....................................... 74/493; 74/527; 74/535
[58] Field of Search ............... 74/493, 527, 531, 535; 280/775

[56] References Cited

U.S. PATENT DOCUMENTS

| | | | |
|---|---|---|---|
| 2,865,222 | 12/1958 | Bachman | 74/493 |
| 3,298,241 | 1/1967 | Rise | 74/493 |
| 3,382,944 | 5/1968 | Zeigler et al. | 180/111 |
| 3,691,866 | 9/1972 | Berkes | 74/493 |
| 3,718,053 | 2/1973 | Cinadr | 74/493 |
| 3,799,569 | 3/1974 | Baker | 280/87 A |
| 4,033,158 | 7/1977 | Chamberlain et al. | 74/493 X |
| 4,265,139 | 5/1981 | Logemann | 74/485 |
| 4,279,176 | 7/1981 | Minamitani | 74/493 |
| 4,300,407 | 11/1981 | Köpf | 74/493 |
| 4,424,721 | 1/1984 | Deacon | 74/493 |
| 4,463,626 | 8/1984 | Kazauka et al. | 74/493 |
| 4,527,444 | 7/1985 | McKee et al. | 74/493 |
| 4,561,323 | 12/1985 | Stromberg | 74/493 |
| 4,674,769 | 6/1987 | Ota et al. | 74/493 X |
| 4,793,204 | 12/1988 | Kubasiak | 74/493 |
| 4,938,093 | 7/1990 | Matsumoto et al. | 74/493 |
| 4,993,279 | 2/1991 | Doescher et al. | 74/493 |

OTHER PUBLICATIONS

"Tilt steering wheel", Toyota Celica Owner's Manual, p. 18, 1986.

Primary Examiner—Allan D. Herrimann
Assistant Examiner—David W. Laub

[57] ABSTRACT

A tilt steering wheel assembly includes a bracket member which supports an upper part of a steering column for pivotal movement about a pivot axis. A sector member has a set of adjustment teeth on one side and a pair of spaced apart detent recesses on the other side. A manually operable pawl member pivots with the bracket member, is slidable towards and away from the sector member has a teeth which are engageable and disengageable with the sector member teeth to releasably hold the bracket member and steering column upper part in a plurality of fine adjustment positions. A manually operable rod is movable towards and away from the sector member and is engageable and disengageable with the detent recesses to allow the sector member's, pawl, bracket member and steering column upper part to pivot together as a unit to a limit position and back to the particular position they occupied just before they were moved to the limit position.

13 Claims, 5 Drawing Sheets

TILT STEERING COLUMN ASSEMBLY

BACKGROUND OF THE INVENTION

This invention relates to a steering column assembly for motor vehicles, and more particularly to a steering column assembly which is adjustable and tiltable and which has a memory mechanism.

In the past, various tilt steering mechanisms have been proposed. However, such mechanisms have typically been complicated with many parts and/or have included parts which protrude outwardly from the steering column and which thereby make the steering column assembly more bulky than is desired. For example, U.S. Pat. No. 4,938,093, issued July 3, 1990 to Matsumoto et al., discloses a tilt steering column with a memory mechanism. But, this mechanism adds a substantial bulk to a portion of the steering column and requires a large number of parts.

U.S. Pat. No. 4,993,279 issued Feb. 19, 1991 to Doescher et al., discloses a somewhat simpler tilt steering system. But, this system is not believed to include a memory feature.

U.S. Pat. No. 4,527,444, issued to McKee et al., discloses a tilt steering wheel arrangement that has an instrument panel rigidly attached to it so that the operator has an unobstructed view of the panel in all steering wheel tilt positions. However, the steering wheel and steering column tilt positions are limited to a range of comfortable driving positions.

SUMMARY OF THE INVENTION

An object of the present invention to provide a simple and inexpensive tilt steering column assembly.

Another object of the present invention is to provide a tilt steering column assembly which can be easily adjusted among a plurality of closely space positions within a particular range.

Another object of the present invention is to provide a tilt steering column assembly which can be easily pivoted to a limit position, but which will automatically return to the particular position it occupied just before it was moved to the limit position.

These and other objects are achieved by the present invention wherein a motor vehicle tilt steering wheel assembly has a steering wheel rotatably mounted on a steering column. The tilt steering wheel assembly includes an elongated steering column having upper and lower parts, and a bracket supporting the upper part of the steering column for pivotal movement about a pivot axis. A sector member includes a body having a set of fine adjustment teeth formed on one side and a pair of spaced apart detent recesses formed on the other side. A manually operable pawl member pivots with the bracket and is slidable towards and away from the sector. The pawl member has teeth which are engageable and disengageable with the sector teeth to releasably hold the bracket and column in a plurality of positions. A manually operable rod is movable towards and away from the sector and is engageable and disengageable with the detent recesses. When the rod is pulled out of one recess, the bracket, pawl and upper part pivot together as a unit to a limit position wherein the rod is releasably received in the other recess. The bracket, pawl and steering column can, as a unit, be pivoted back to the particular position they occupied just before they were moved to the limit position, at which position the rod will again be received by the first recess. A spring is biased to urge the bracket, pawl and column to the limit position.

DETAILED DESCRIPTION

Figure 1:
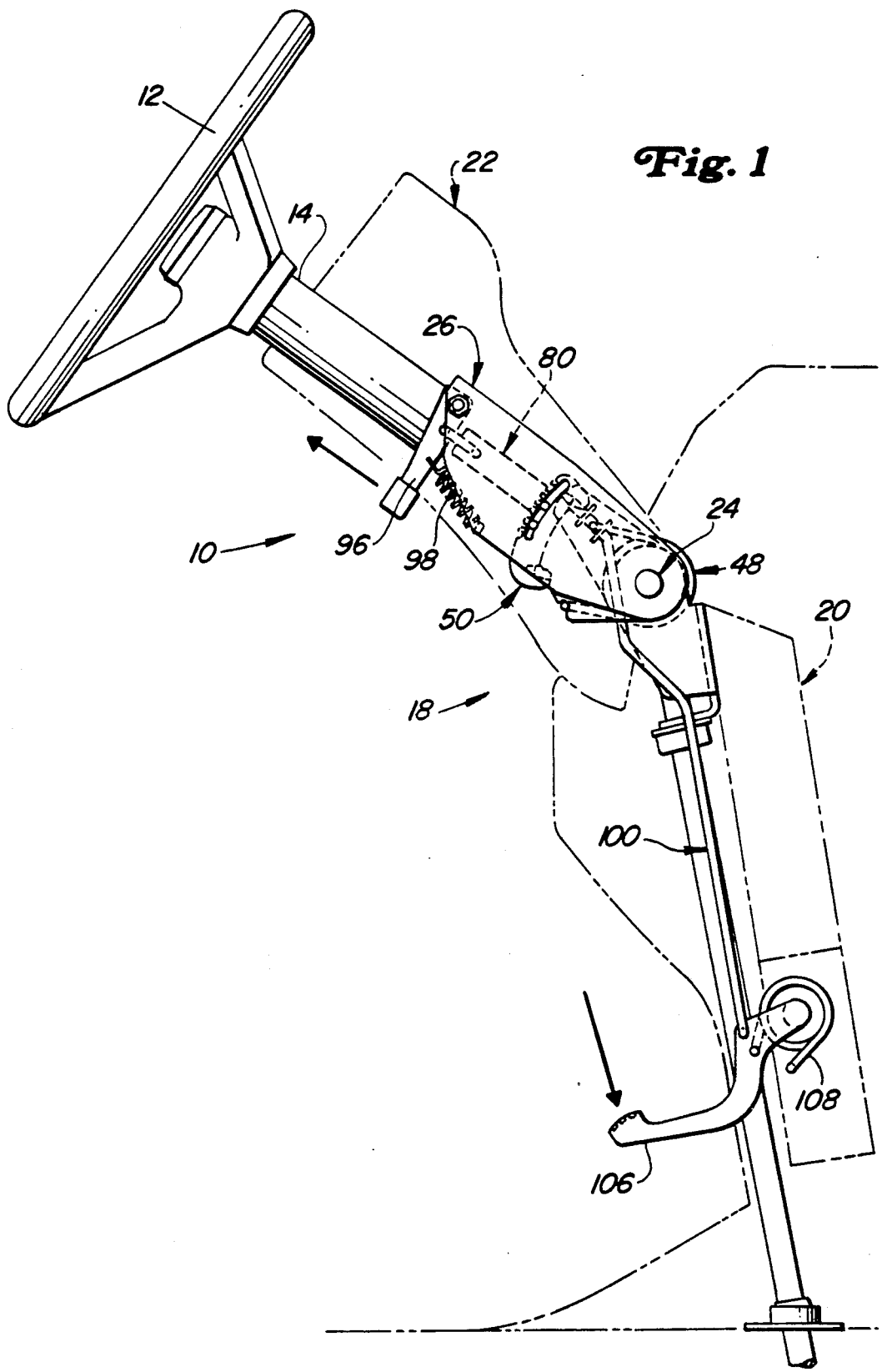
FIG. 1 is a side view of the tilt steering column assembly according to the present invention.

Referring now to FIGS. 1, 2, 4 and 5, a tilt steering column assembly 10 includes a steering wheel 12 attached to a steering shaft 14 which extends through a housing 18. The steering shaft 14 extends through and is supported by a lower stationary steering column part 20 and an upper steering column part 22 which is pivotal about a pivot 24. The lower part 20 includes a pair of fixed arms 19, 21 which extend laterally and upwardly from the pivot 24.

A bracket member 26 is fixed by conventional means (not shown) to the upper part 22 and is also pivotal about pivot 24. Referring now to FIGS. 2-5, the bracket 26 has a body which forms a central hub 27 through which extends an opening 28 for receiving the shaft 14. On opposite sides of the hub 27 are formed a pair of side plates 30 and 32 which are joined together by a plate 34. A pivot opening 31 extends through an end of both plates 30, 32. A rectangular opening 36 extends through the hub 27 adjacent to the opening 28 and adjacent to the plate 30. A curved slot 38 is formed in plate 30 and this slot 38 has a radius of curvature which is centered at the axis of the pivot 24. A wall 40 is formed adjacent the opening 28 and cooperates with plate 30 and hub 27 to form a channel 42 which is joined with the opening 36 and which extends generally perpendicular to the axis of pivot 24. An L-shaped guide member 44 is attached to the plates 30 and 34 and together therewith surrounds a guide opening 46 which is in line with the opening 36.

A spring 48 has one end 47 received in recess 43 formed in an edge of plate 30 and a second end 49 received in a slot 45 formed in the arm 19. Spring 48 is biased to urge the bracket 26 and upper part 22 in a clockwise direction, viewing FIGS. 1, 2 and 5.

Figure 4:
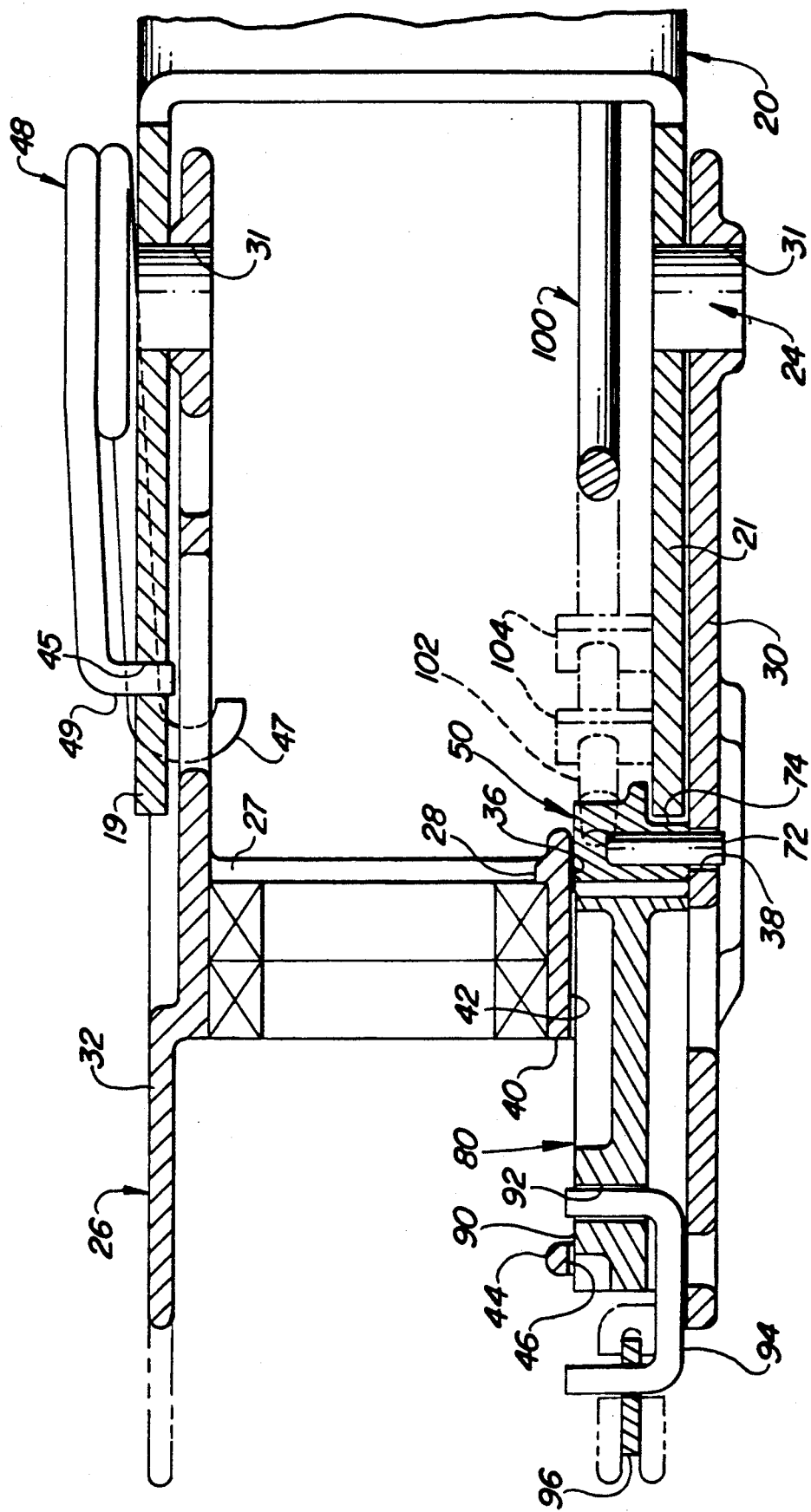
FIG. 4 is a cross sectional view in the direction of arrows 4—4 of FIG. 2.

A sector member 50 includes a curved body 52 with a convex side 54 and a concave side 56. A set of teeth 58 are formed on the convex side 54. A slot 60 extends in the concave side 56 between detent recesses 62 and 64 which are located just inside end walls 66 and 68, respectively. The end walls 66, 68 form abutment surfaces 67 and 69, respectively. A pair of spaced apart blind pin bores 70 extend into the body 52 in a direction which is perpendicular to the plane of curvature of the sector member 50. Pins 72 are pressed into bores 70. As best seen in FIG. 4, the sector member 50 is slidably mounted between wall 40 and plate 30 so that the pins 72 are slidably received in the slot 38 and so that the teeth 58 are facing in the direction of guide member 44. As best seen in FIG. 4, the sector member 50 includes a channel 74 which provides clearance for the arm 21.

A pawl 80 includes an elongated body 82 with a set of teeth 84 formed on one end thereof. The body 82 also forms a pair of channels 86, 88 and a boss 90 through which extends a bore 92. As best seen in FIG. 4, the pawl 80 is mounted to slide back and forth in and through the channel 42 and the guide opening 46 so that the teeth 84 will engage and disengage the teeth 58 of sector 50. A link 94 couples the pawl 80 to a manually operable lever 96 so that by manipulation of lever 96 the pawl can be moved into and out of engagement with the teeth 58. A spring 98 is coupled between the lever 96 and the bracket 26 and is biased to urge the pawl teeth 84 into engagement with the sector teeth 58. The lever 96 is pivotally coupled to the plate 32 by a bolt 97 which is received in a bore 99 formed in the plate 32.

An elongated rod 100 has an end 102 which is slidably received by a pair of apertured rod guides 104 which are fixed to the fixed arm 21. The end 102 of the rod 100 is receivable in the detent recesses 62 and 64 of the sector member 50 and is engageable with the abutment surfaces 67, 68. The other end of the rod 100 is pivotally coupled to a manually operable pedal 106. A spring 108 is coupled to the pedal 106 and is biased to urge the pedal 106 in a clockwise direction viewing FIG. 1, which in turn, urges the end 102 of rod 100 towards the sector 50.

MODE OF OPERATION

Figure 2:
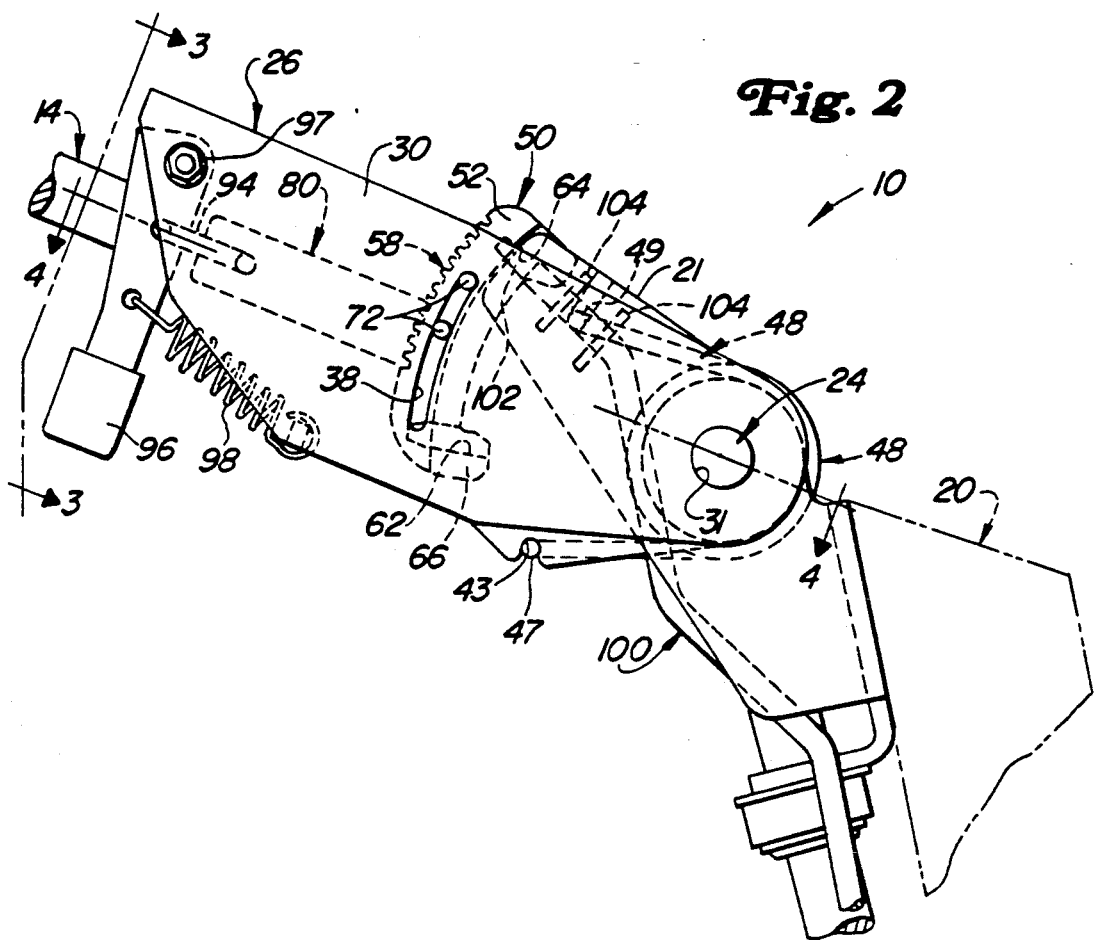
FIG. 2 is an enlarged side view of the tilt steering column assembly of the present invention in a normal operating position.
Figure 3:
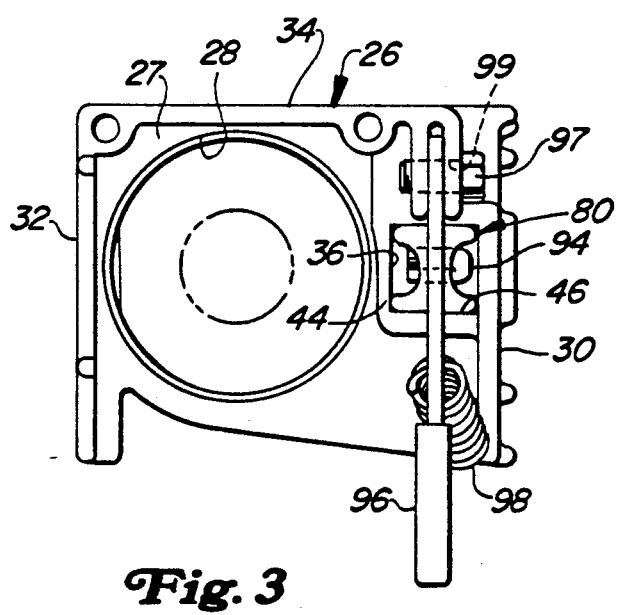
FIG. 3 is a view in the direction of arrows 3—3 of FIG. 2.

Viewing FIGS. 1 and 2, if it is desired to change the angle of tilt of steering column assembly 10 by a small amount anywhere within a range defined by the extent of the teeth 58, it is only necessary to raise the free end of lever 96. This moves the pawl 80 away from the teeth 58 of sector 50 and allows the pawl 80, the bracket member 26, upper part 22, the upper portion of the shaft 14 and the steering wheel 12 to be pivoted about pivot axis 24. At the same time, the rod end 102 will remain in the detent recess 64, thus preventing the sector 50 from pivoting about the pivot axis 24. When the tilt has been adjusted by the desired amount, the lever 96 is released and spring 98 will move the teeth 84 of pawl 80 back into engagement with teeth 58 of sector 50, holding the desired tilt until another change is desired.

Figure 5:
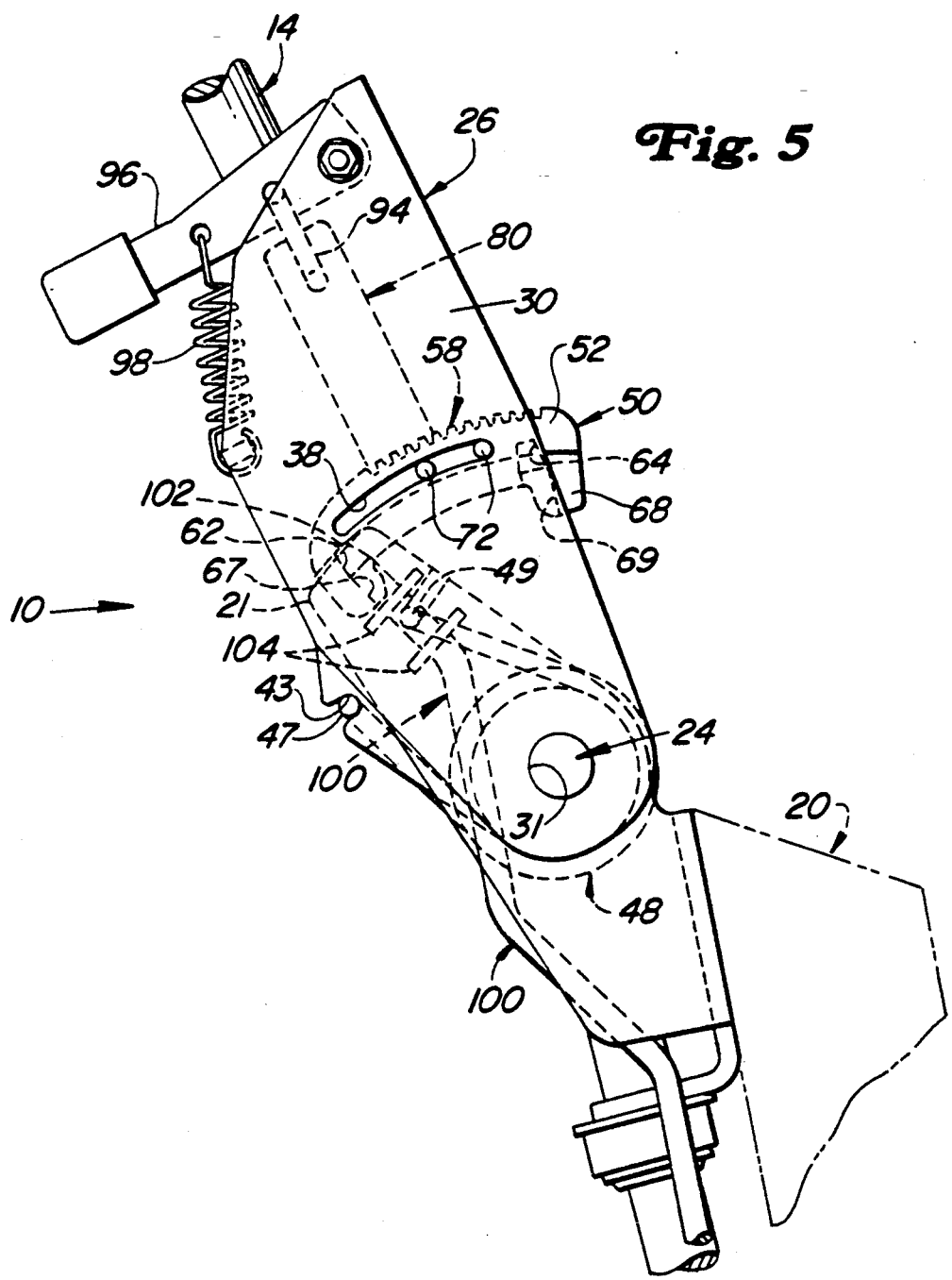
FIG. 5 is an enlarged side view of the tilt steering column assembly of the present invention in a raised position.
Figure 6:
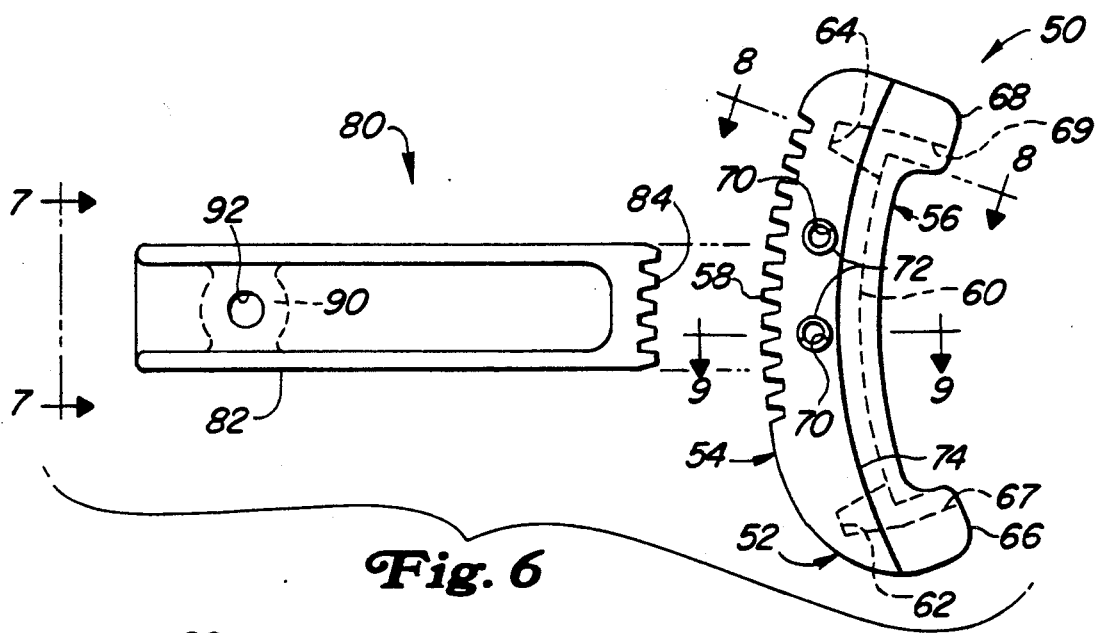
FIG. 6 is an enlarged view of the pawl and sector elements of the tilt steering column assembly of the present invention.
Figure 7:
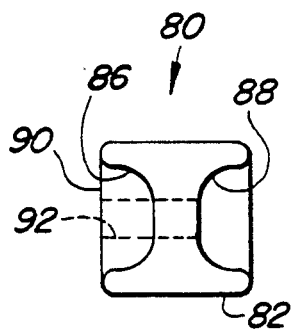
FIG. 7 is a cross sectional view in the direction of arrows 7—7 of FIG. 6.
Figure 8:
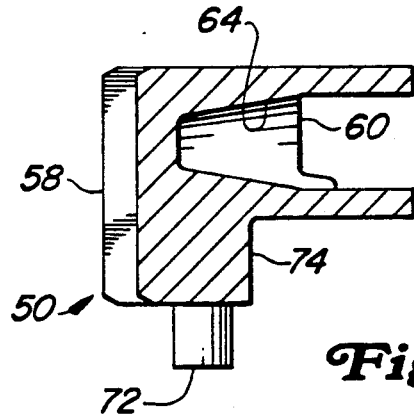
FIG. 8 is a cross sectional view in the direction of arrows 8—8 of FIG. 6.
Figure 9:
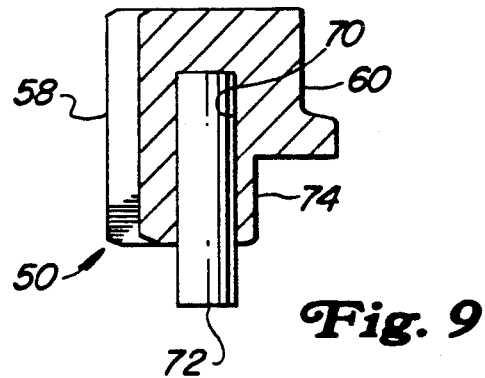
FIG. 9 is a cross sectional view in the direction of arrows 9—9 of FIG. 6.

Viewing FIGS. 2 and 5, if it is desired to raise the steering column assembly 10 by the maximum amount, it is only necessary to depress the free end of pedal 106. This moves the rod end 102 out of detent recess 64 of sector 50 and allows spring 48 to pivot the assembly comprising sector 50, the pawl 80, the bracket member 26, the upper portion of the shaft 14 and the steering wheel 12 clockwise about pivot axis 24. The assembly will pivot in this direction until the end 102 of rod 100 engages abutment surface 67 of end wall 66, whereupon, if the pedal 106 is released, the rod end 102 will be received by detent recess 62 to releasably hold the assembly in a fully raised limit position. At the same time, the teeth 84 of pawl 80 will remain engaged with the sector teeth 58, thus preventing relative movement between the steering wheel 12 and the sector 50. Therefore, when pedal 106 is depressed again, the steering wheel may be manually pivoted counter-clockwise until the end 102 of rod 100 engages abutment surface 69 of wall 68 and falls into detent recess 64. At this point, because the relationship between pawl 80 and sector 50 has not changed, the steering wheel 12 will have returned to its original position, and the original position will have been "memorized".

While preferred embodiments of the invention have been illustrated and described, it will be apparent to those skilled in the art that variations and modifications thereof can be made without departing from the underlying principles of the invention. Accordingly, this invention is intended to embrace all such alternatives, modifications and variations which fall within the spirit and scope of the appended claims.

I claim:

1. A tilt mechanism for a steering wheel system having a steering column with a fixed lower part and an upper part pivotally coupled to the lower part about a pivot axis, the tilt mechanism comprising:

a sector member, the sector member comprising a body having a set of teeth formed on a surface thereof, the body also having first and second spaced apart abutments and at least one detent recess adjacent the first abutment;

a manually operable pawl member, the pawl member being coupled to the upper part for pivoting movement therewith about the axis and for movement towards and away from the sector number for engagement and disengagement with the teeth to releasably hold the upper part in a selectable one of a plurality of positions relative to the sector member;

a manually operable release member, the release member being movable towards and away from the sector member and engageable and disengageable with the abutments and with the detent recess to releasably hold the sector member in selected positions; and a resilient member biased to urge the sector member and upper part from a normal position wherein the release member is received by the detent recess to a limit position wherein the release member engages the second abutment when the release member is moved out of the detent recess.

2. A tilt mechanism for a steering wheel system having a steering column with a fixed lower part and an upper part pivotally coupled to the lower part about a pivot axis, the tilt mechanism comprising:

a bracket member fixed to the upper part and pivotal about the pivot axis;

a sector member, the sector member comprising a body having a set of teeth formed on a surface thereof, the body also having first and second spaced apart abutments and at least one detent recess adjacent the first abutment;

a manually operable pawl member, the pawl member being coupled to the bracket member for pivoting movement therewith about the pivot axis and for movement towards and away from the sector member for engagement and disengagement with the teeth to releasably hold the bracket member and upper part column in a selectable one of a plurality of positions;

a manually operable release member, the release member being movable towards and away from the sector and engageable and disengageable with the abutments and with the detent recess; and a resilient member biased to urge the bracket member, sector member and upper part from a normal position wherein the release member is received by the detent recess to a limit position wherein the release member engages the second abutment when the release member is moved out of the detent recess.

3. The invention of claim 2, wherein:

the surface of the sector body in which the detent recess is formed is opposite from the surface of the sector body in which the teeth are formed.

4. The invention of claim 2, wherein:

the sector member includes a further detent recess adjacent the second abutment and spaced apart from the first recess, the further detent recess receiving the release member when the bracket member, sector member and upper part are in the limit position.

5. The invention of claim 2, wherein:

one of the bracket and sector members has a curved slot formed therein; and a pin projects from the other of the bracket and sector members, the pin being slidably received by the slot and the pin being engageable with ends of the slot to limit relative motion between the bracket member and the sector member.

6. The invention of claim 5, wherein:

the curved slot is formed in the bracket member; and the pin projects from the sector member.

7. The invention of claim 2, wherein:

one of the bracket and sector members has a curved slot formed therein; and a pair of pins projects from the other of the bracket and sector members, the pins being slidably received by the slot and the pins being engageable with ends of the slot to limit relative motion between the bracket member and the sector member.

8. The invention of claim 7, wherein:

the curved slot is formed int he bracket member; and the pins project from the sector member.

9. The invention of claim 2, wherein:

the bracket member comprises means for supporting the pawl member for sliding movement towards and away from the sector member in directions which are parallel to an axis of the steering column.

10. The invention of claim 2, wherein the bracket member comprises:

a hub having an opening through which extends a steering shaft;

a pair of side plates fixed to opposite sides of the hub and extending generally parallel to an axis of the steering shaft, each side plate having means for supporting the bracket member for pivoting movement about the pivot axis, the hub and one of the side plates forming a channel which slidably receives the sector member.

11. The invention of claim 2, wherein the bracket member comprises:

a hub having a first opening which receives a portion of a steering shaft and a second opening adjacent to the first opening, the pawl member and the sector member engaging each other through the second opening.

12. The invention of claim 11, wherein the bracket member comprises:

a pair of side plates fixed to opposite sides of the hub, each side plate having means for supporting the bracket member for pivoting movement about the pivot axis.

13. The invention of claim 2, wherein:

the bracket member forms a channel which extends generally perpendicular to the pivot axis, the pawl member being slidably received in the channel for movement towards and away from the sector member.

* * * * *

UNITED STATES PATENT AND TRADEMARK OFFICE
CERTIFICATE OF CORRECTION

PATENT NO. : 5,168,768
DATED : 8 December 1992
INVENTOR(S) : David Joseph Easton It is certified that error appears in the above-identified patent and that said Letters Patent is hereby corrected as shown below:

In Col. 4, line 31, delete "number" and insert -- member --.

In Col. 5,
    line 11, after "sector", insert -- members --.
    line 13, after "sector", insert -- members --.

In Col. 6, line 2, delete "int he" and insert -- in the --.

Signed and Sealed this

Fifteenth Day of February, 1994

Attest:

BRUCE LEHMAN

Attesting Officer     Commissioner of Patents and Trademarks